(12) United States Patent
Chen et al.

(10) Patent No.: US 11,770,784 B2
(45) Date of Patent: *Sep. 26, 2023

(54) MULTI-MEMBER BLUETOOTH DEVICE CAPABLE OF REDUCING COMPLEXITY OF UPDATING INTERNAL CLOCK OF BLUETOOTH CIRCUIT

(71) Applicant: Realtek Semiconductor Corp., Hsinchu (TW)

(72) Inventors: Yi-Cheng Chen, Hsinchu (TW); Kuan-Chung Huang, Hsinchu (TW); Hung-Chuan Chang, Hsinchu (TW); Chin-Wen Wang, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/889,949

(22) Filed: Aug. 17, 2022

(65) Prior Publication Data

US 2022/0394641 A1 Dec. 8, 2022

Related U.S. Application Data

(62) Division of application No. 17/081,591, filed on Oct. 27, 2020, now Pat. No. 11,457,421.

(30) Foreign Application Priority Data

Sep. 29, 2020 (TW) .................................. 109133958

(51) Int. Cl.
*H04W 56/00* (2009.01)
*H04W 4/80* (2018.01)
*H04W 84/20* (2009.01)

(52) U.S. Cl.
CPC ........... *H04W 56/001* (2013.01); *H04W 4/80* (2018.02); *H04W 84/20* (2013.01)

(58) Field of Classification Search
CPC .... H04B 5/0006; H04B 5/0031; H04B 17/20; H04L 1/18; H04L 7/0008; H04L 7/027;
(Continued)

(56) References Cited

U.S. PATENT DOCUMENTS 8,102,836 B2 * 1/2012 Jerlhagen ................ H04L 47/10
455/3.06
8,768,252 B2 7/2014 Watson et al.
(Continued)

FOREIGN PATENT DOCUMENTS

JP 2002-152212 A 5/2002
JP 2009/153070 A 7/2009
(Continued)

OTHER PUBLICATIONS

U.S. Office Action for U.S. Appl. No. 14/831,744, dated Jan. 31, 2023.
(Continued)

*Primary Examiner* — Frank Duong
(74) *Attorney, Agent, or Firm* — Birch, Stewart, Kolasch & Birch, LLP (57) ABSTRACT

A multi-member Bluetooth device for communicating data with a source Bluetooth device acting as a master in a first piconet. The multi-member Bluetooth device includes a main Bluetooth circuit acting as a slave in the first piconet and as a master in a second piconet, and an auxiliary Bluetooth circuit acting as a slave in the second piconet. The main Bluetooth circuit generates a first slave clock and a second main clock according to a first main clock generated by the source Bluetooth device, with which both the first slave clock and the second main clock are synchronized. The
(Continued)

auxiliary Bluetooth circuit generates a second slave clock and a third slave clock according to the second main clock, with which both the second slave clock and the third slave clock are synchronized. The auxiliary Bluetooth circuit sniffs Bluetooth packets transmitted through the first piconet from the source Bluetooth device.

10 Claims, 5 Drawing Sheets

Related U.S. Application Data

(60) Provisional application No. 62/930,567, filed on Nov. 5, 2019.

(58) Field of Classification Search
CPC ....... H04W 4/80; H04W 28/04; H04W 36/18; H04W 36/30; H04W 40/12; H04W 40/22; H04W 56/001; H04W 84/18; H04W 84/20; H04W 88/04
See application file for complete search history.

(56) References Cited

U.S. PATENT DOCUMENTS

| | | | |
|---|---|---|---|
| 10,009,862 | B1 | 6/2018 | Malovany et al. |
| 10,750,459 | B2* | 8/2020 | Girardier ............ H04W 56/001 |
| 10,848,926 | B2 | 11/2020 | Kanbara |
| 2002/0028658 | A1 | 3/2002 | Ami et al. |
| 2003/0016770 | A1 | 1/2003 | Trans et al. |
| 2008/0291863 | A1 | 11/2008 | Agren |
| 2008/0317188 | A1 | 12/2008 | Staszewski et al. |
| 2009/0161602 | A1 | 6/2009 | Matsumoto |
| 2016/0098244 | A1 | 4/2016 | Hsieh et al. |
| 2018/0006798 | A1 | 1/2018 | Bilstad et al. |
| 2019/0274024 | A1 | 9/2019 | Sung et al. |
| 2019/0320345 | A1 | 10/2019 | Chen et al. |
| 2020/0137699 | A1* | 4/2020 | Girardier ................ H04W 4/80 |
| 2021/0136551 | A1 | 5/2021 | Chang et al. |
| 2021/0136705 | A1 | 5/2021 | Chang et al. |
| 2021/0136711 | A1 | 5/2021 | Chen et al. |

FOREIGN PATENT DOCUMENTS

| | | |
|---|---|---|
| WO | WO 2019/051089 A2 | 3/2019 |
| WO | WO 2019/083840 A1 | 5/2019 |

OTHER PUBLICATIONS

Japanese Office Action for Japanese Application No. 2020-183912, dated Oct. 12, 2021, with English translation.
Japanese Office Action for Japanese Application No. 2020-183919, dated Nov. 24, 2021, with English translation.
Japanese Office Action for Japanese Application No. 2020-184664, dated Nov. 2, 2021, with English translation.
Japanese Office Action for Japanese Application No. 2020-184671, dated Nov. 24, 2021, with English translation.
Korean Office Action for Korean Application No. 10-2020-0145869, dated Dec. 23, 2021, with English translation.
Korean Office Action for Korean Application No. 10-2020-0145884, dated Dec. 23, 2021, with English translation.
Korean Office Action for Korean Application No. 10-2020-0146000, dated Dec. 23, 2021, with English translation.
Korean Office Action for Korean Application No. 10-2020-0146050, dated Dec. 23, 2021, with English translation.
Taiwanese Notice of Allowance for Taiwanese Application No. 109133958, dated Jan. 28, 2021, with English translation.
Taiwanese Office Action and Search Report for Taiwanese Application No. 109133958, dated Dec. 14, 2020, with partial English translation.
Taiwanese Office Action and Search Report for Taiwanese Application No. 109133959, dated Dec. 18, 2020, with partial English translation.
Taiwanese Office Action and Search Report for Taiwanese Application No. 109133960, dated Dec. 18, 2020, with partial English translation.
U.S. Office Action for U.S. Appl. No. 17/081,182, dated Jul. 1, 2022.
U.S. Office Action for U.S. Appl. No. 17/081,505, dated Mar. 17, 2022.
U.S. Office Action for U.S. Appl. No. 17/081,652, dated Mar. 11, 2022.

* cited by examiner

MULTI-MEMBER BLUETOOTH DEVICE CAPABLE OF REDUCING COMPLEXITY OF UPDATING INTERNAL CLOCK OF BLUETOOTH CIRCUIT

CROSS-REFERENCE TO RELATED APPLICATIONS

This application is a Divisional of co-pending U.S. patent application Ser. No. 17/081,591, filed on Oct. 27, 2020, which claims the benefit of priority to Patent Application No. 109133958, filed in Taiwan on Sep. 29, 2020, and also claims the benefit of priority to U.S. Provisional Application Ser. No. 62/930,567, filed on Nov. 5, 2019; the entirety of which is incorporated herein by reference for all purposes.

BACKGROUND

The disclosure generally relates to a Bluetooth technology and, more particularly, to an auxiliary Bluetooth circuit of a multi-member Bluetooth device capable of reducing complexity of updating piconet clock.

According to Bluetooth communication protocols, two or more Bluetooth circuits may form a piconet, and an individual Bluetooth circuit may be a member of different piconets simultaneously. However, each Bluetooth circuit in the same piconet needs to schedule transmission and reception of packets based on a particular piconet clock, so as to avoid packet loss or packet collision.

In a conventional Bluetooth network architecture, the piconet clocks of different piconets are independent and uncorrelated to each other. Thus, if a Bluetooth circuit participates in multiple piconets simultaneously, the Bluetooth circuit needs to generate multiple internal clocks which are independent from each other, and needs to update the offset of respective internal clocks, so that these internal clocks are always synchronized with respective corresponding piconet clocks. Such architecture not only increases the circuitry complexity inside the Bluetooth circuit but also reduces the Bluetooth bandwidth utilization efficiency of the Bluetooth circuit.

SUMMARY

An example embodiment of a multi-member Bluetooth device utilized to operably conduct data transmission with a source Bluetooth device is disclosed. The source Bluetooth device acts as a master in a first piconet. The multi-member Bluetooth device comprises: a main Bluetooth circuit, comprising: a first Bluetooth communication circuit; a first packet parsing circuit, arranged to operably parse packets received by the first Bluetooth communication circuit; a first clock adjusting circuit; a first control circuit, coupled with the first Bluetooth communication circuit, the first packet parsing circuit, and the first clock adjusting circuit, arranged to operably control the main Bluetooth circuit to act as a slave in the first piconet, and to act as a master in a second piconet; and an auxiliary Bluetooth circuit, comprising: a second Bluetooth communication circuit; a second packet parsing circuit, arranged to operably parse packets received by the second Bluetooth communication circuit; a second clock adjusting circuit; and a second control circuit, coupled with the second Bluetooth communication circuit, the second packet parsing circuit, and the second clock adjusting circuit, arranged to operably control the auxiliary Bluetooth circuit to act as a slave in the second piconet; wherein the first control circuit is further arranged to operably conduct following operations: controlling the first clock adjusting circuit to generate a first slave clock and a second main clock according to a timing data of a first main clock generated by the source Bluetooth device, so that both the first slave clock and the second main clock are synchronized with the first main clock; controlling the first Bluetooth communication circuit to transmit or receive packets in the first piconet according to the first slave clock; and controlling the first Bluetooth communication circuit to transmit or receive packets in the second piconet according to the second main clock; wherein the second control circuit is further arranged to operably conduct following operations: controlling the second clock adjusting circuit to generate a second slave clock and a third slave clock according to a timing data of the second main clock, so that both the second slave clock and the third slave clock are synchronized with the second main clock; and controlling the second Bluetooth communication circuit to operate based on the third slave clock to sniff Bluetooth packets issued in the first piconet by the source Bluetooth device.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
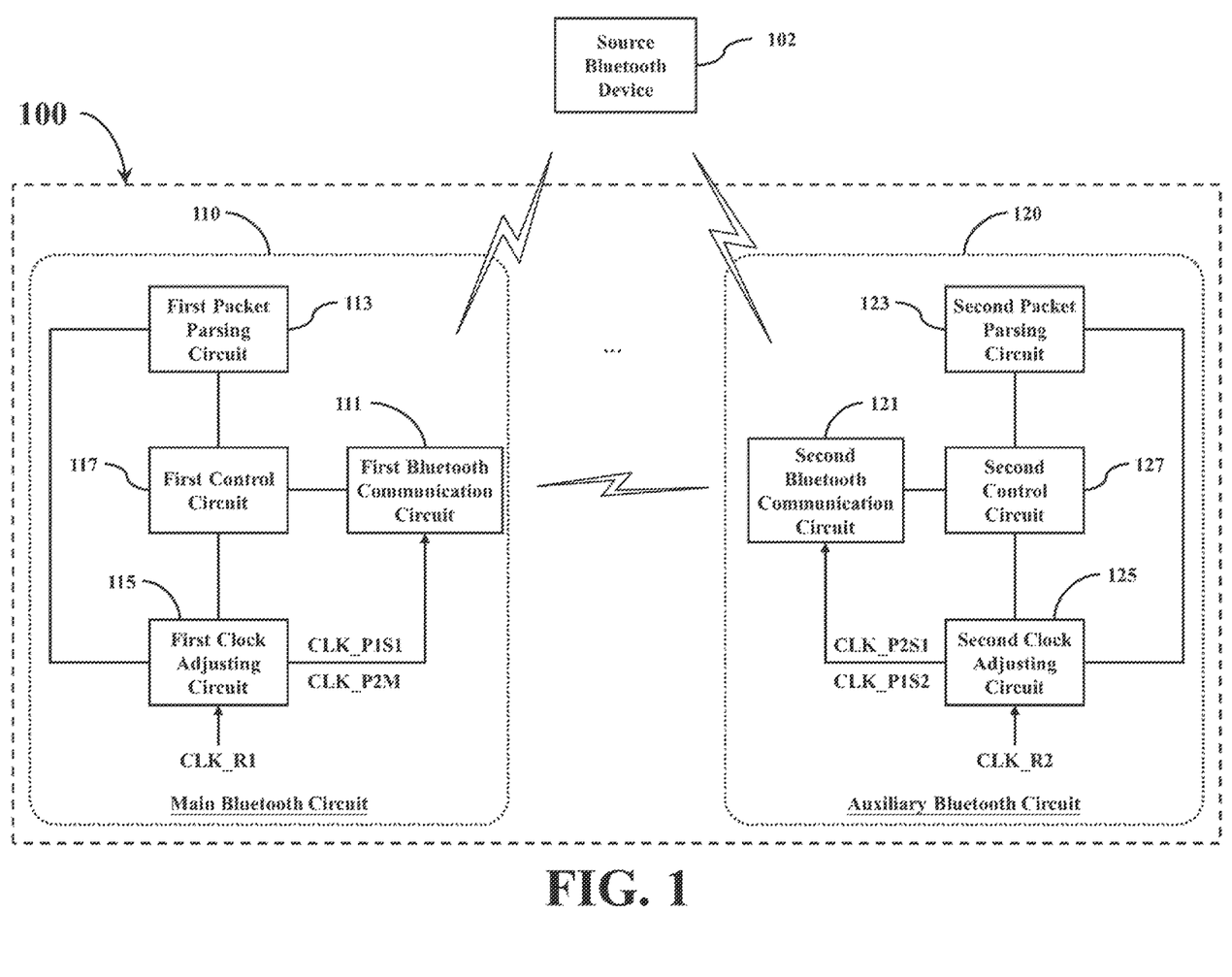
FIG. 1 shows a simplified functional block diagram of a multi-member Bluetooth device according to one embodiment of the present disclosure.

FIG. 1 shows a simplified functional block diagram of a multi-member Bluetooth device 100 according to one embodiment of the present disclosure. The multi-member Bluetooth device 100 is arranged to operably conduct data transmission with a source Bluetooth device 102, and comprises multiple member circuits. For the convenience of description, only two member circuits are illustrated in the embodiment of FIG. 1, which respectively are a first Bluetooth circuit 110 and an auxiliary Bluetooth circuit 120.

In this embodiment, all member circuits of the multi-member Bluetooth device 100 have a similar main circuit structure, but different additional circuit components may be arranged in different member circuits, rather than restricting all member circuits to have an identical circuit structure. As shown in FIG. 1, for example, the main Bluetooth circuit 110 comprises a first Bluetooth communication circuit 111, a first packet parsing circuit 113, a first clock adjusting circuit 115, and a first control circuit 117. Similarly, the auxiliary Bluetooth circuit 120 comprises a second Bluetooth communication circuit 121, a second packet parsing circuit 123, a second clock adjusting circuit 125, and a second control circuit 127.

In the main Bluetooth circuit 110, the first Bluetooth communication circuit 111 is arranged to operably conduct data communication with other Bluetooth devices. The first packet parsing circuit 113 is arranged to operably parse packets received by the first Bluetooth communication circuit 111. The first clock adjusting circuit 115 is coupled with the first packet parsing circuit 113, and arranged to operably adjust internal clock signals adopted by the main Bluetooth circuit 110 so as to synchronize a piconet clock adopted by the first Bluetooth circuit 110 and other Bluetooth devices.

The first control circuit 117 is coupled with the first Bluetooth communication circuit 111, the first packet parsing circuit 113, and the first clock adjusting circuit 115, and is arranged to operably control the operations of the aforementioned circuits. In operations, the first control circuit 117 may directly conduct data communication with the source Bluetooth device 102 through the first Bluetooth communication circuit 111 by using a Bluetooth wireless transmission approach, and may conduct data communication with other member circuits through the first Bluetooth communication circuit 111. The first control circuit 117 may further utilize the first packet parsing circuit 113 to parse the packets received by the first Bluetooth communication circuit 111 so as to acquire related data or instructions.

In the auxiliary Bluetooth circuit 120, the second Bluetooth communication circuit 121 is arranged to operably conduct data communication with other Bluetooth devices. The second packet parsing circuit 123 is arranged to operably parse the packets received by the second Bluetooth communication circuit 121. The second clock adjusting circuit 125 is coupled with the second packet parsing circuit 123, and arranged to operably adjust internal clock signals adopted by the auxiliary Bluetooth circuit 120 so as to synchronize a piconet clock adopted by the auxiliary Bluetooth circuit 120 and other Bluetooth devices.

The second control circuit 127 is coupled with the second Bluetooth communication circuit 121, the second packet parsing circuit 123, and the second clock adjusting circuit 125, and is arranged to operably control the operations of the aforementioned circuits. In operations, the second control circuit 127 may conduct data communication with other Bluetooth devices through the second Bluetooth communication circuit 121 by using the Bluetooth wireless transmission approach, and may conduct data communication with other member circuits through the second Bluetooth communication circuit 121. The second control circuit 127 may further utilize the second packet parsing circuit 123 to parse the packets received by the second Bluetooth communication circuit 121 so as to acquire related data or instructions.

In practice, each of the aforementioned first Bluetooth communication circuit 111 and second Bluetooth communication circuit 121 may be realized with appropriate wireless communication circuits supporting various versions of Bluetooth communication protocols. Each of the aforementioned first packet parsing circuit 113 and second packet parsing circuit 123 may be realized with various packet demodulating circuits, digital processing circuits, micro-processors, or ASICs (Application Specific Integrated Circuits). Each of the aforementioned first clock adjusting circuit 115 and second clock adjusting circuit 125 may be realized with various appropriate circuits capable of comparing and adjusting clock frequency and/or clock phase, such as various PLLs (phase-locked loops) or DLLs (delay-locked loops) or the like. Each of the aforementioned first control circuit 117 and second control circuit 127 may be realized with various micro-processors or digital signal processing circuits having appropriate computing capability.

In some embodiments, the first clock adjusting circuit 115 and the second clock adjusting circuit 125 may be respectively integrated into the first control circuit 117 and the second control circuit 127. In addition, the aforementioned first packet parsing circuit 113 and second packet parsing circuit 123 may be respectively integrated into the aforementioned first Bluetooth communication circuit 111 and second Bluetooth communication circuit 121.

In other words, the aforementioned first Bluetooth communication circuit 111 and first packet parsing circuit 113 may be realized with separate circuits, or may be realized with the same circuit. Similarly, the aforementioned second Bluetooth communication circuit 121 and second packet parsing circuit 123 may be realized with separate circuits, or may be realized with the same circuit.

In applications, different functional blocks of the aforementioned main Bluetooth circuit 110 may be integrated into a single circuit chip. For example, all functional blocks of the main Bluetooth circuit 110 may be integrated into a single Bluetooth controller IC. Similarly, all functional blocks of the auxiliary Bluetooth circuit 120 may be integrated into another single Bluetooth controller IC.

In practical applications, the multi-member Bluetooth device 100 may be realized with a Bluetooth device formed by multiple Bluetooth circuits cooperating with each other, such as a pair of Bluetooth earphones, a set of Bluetooth speakers, or the like. The source Bluetooth device 102 may be realized with various electronic apparatuses with Bluetooth communication function such as computers, mobile phones, tablet computers, smart speakers, or game consoles.

As can be appreciated from the foregoing descriptions, different member circuits of the multi-member Bluetooth device 100 may conduct data communication with one another through respective Bluetooth communication circuits, so as to form various types of Bluetooth network. When the multi-member Bluetooth device 100 conducts data communication with the source Bluetooth device 102, the source Bluetooth device 102 treats the multi-member Bluetooth device 100 as a single Bluetooth device.

The main Bluetooth circuit 110 may adopt various existing mechanisms to receive the packets issued from the source Bluetooth device 102, and during the operation of the main Bluetooth circuit 110, the auxiliary Bluetooth circuit 120 may acquire the packets issued from the source Bluetooth device 102 by adopting appropriate mechanisms.

For example, in a period during which the main Bluetooth circuit 110 receives the packets issued from the source Bluetooth device 102, the auxiliary Bluetooth circuit 120 may operate at a sniffing mode to actively sniff the packets issued from the source Bluetooth device 102. Alternatively, the auxiliary Bluetooth circuit 120 may operate at a relay mode to passively receive the packets forwarded from the main Bluetooth circuit after the packets issued from the source Bluetooth device 102 are received by the main Bluetooth circuit 110, and the auxiliary Bluetooth circuit 120 does not actively sniff the packets issued from the source Bluetooth device 102.

Please note that two terms "main Bluetooth circuit" and "auxiliary Bluetooth circuit" used throughout the description and claims are merely for the purpose of distinguishing different approaches of receiving packets issued from the source Bluetooth device 102 adopted by different member circuits, rather than indicating that the main Bluetooth circuit 110 is required to have a specific level of control authority over other operational aspects of the auxiliary Bluetooth circuit 120.

Figure 2:
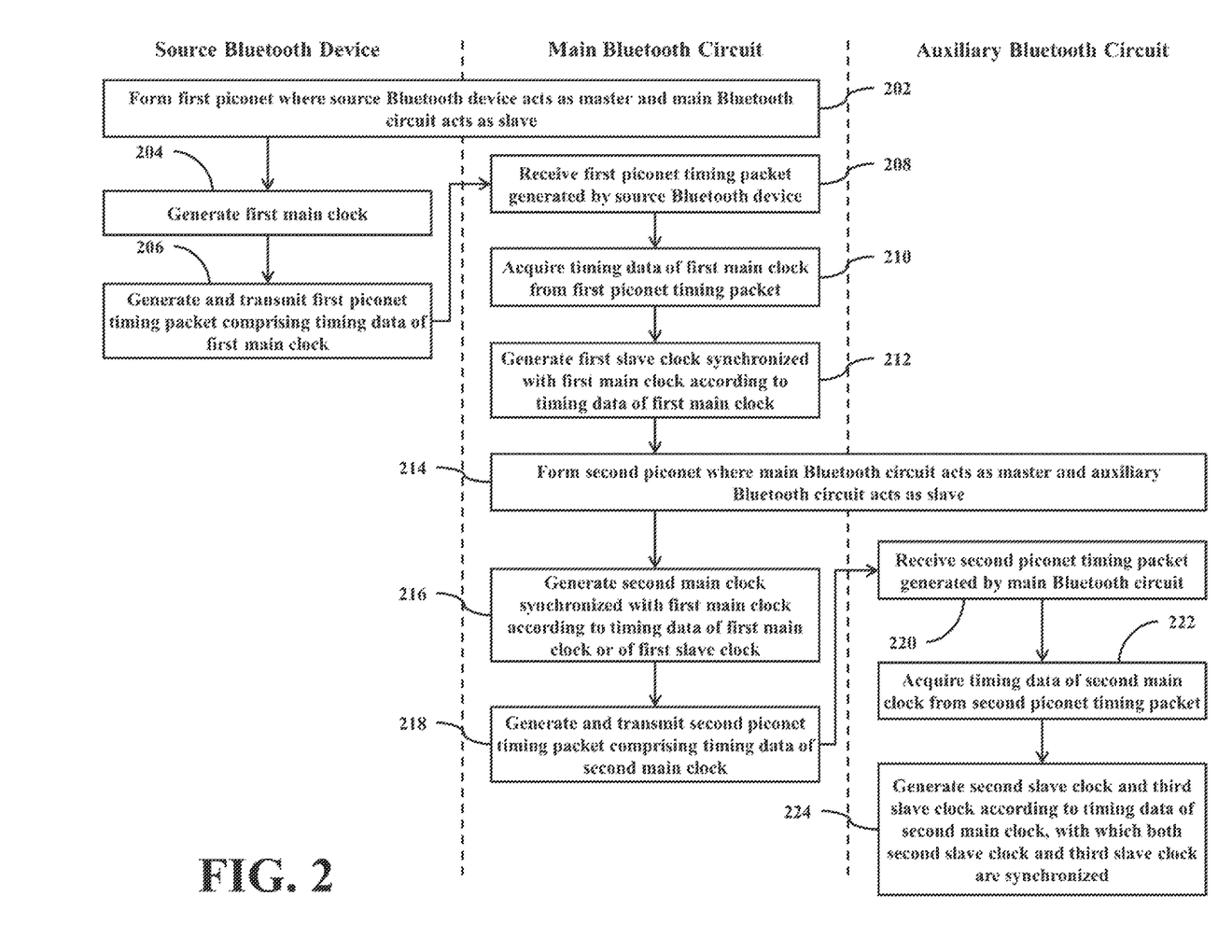
FIG. 2 shows a simplified flowchart of an internal clock generating method adopted by the multi-member Bluetooth device of FIG. 1 according to one embodiment of the present disclosure.
Figure 3:
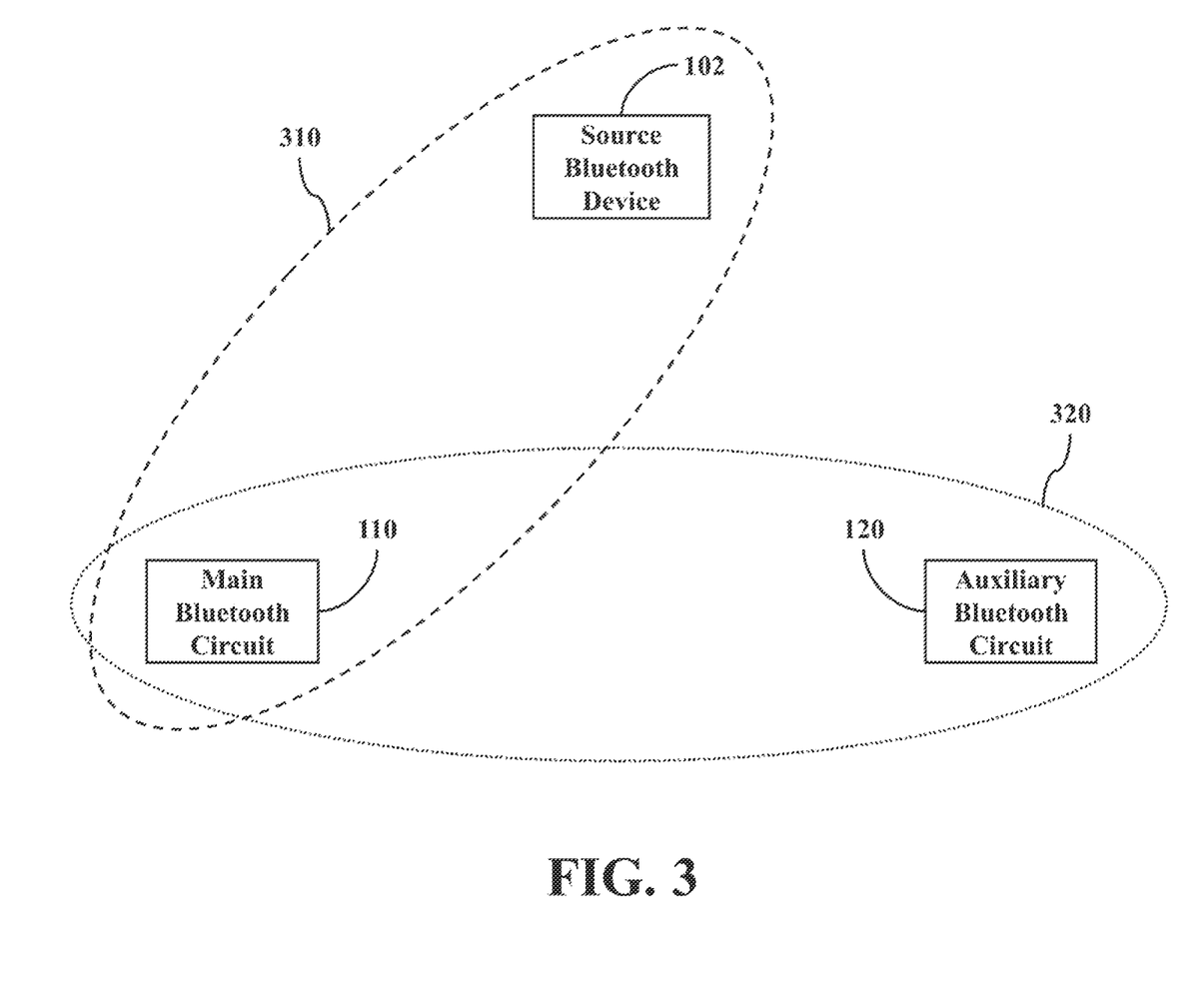
FIG. 3 shows a simplified schematic diagram of a scatternet formed by the multi-member Bluetooth device of FIG. 1 according to one embodiment of the present disclosure.

The operations of the multi-member Bluetooth device 100 will be further described in the following by reference to FIG. 2 through FIG. 3. FIG. 2 shows a simplified flowchart of an internal clock generating method adopted by the multi-member Bluetooth device 100 according to one embodiment of the present disclosure. FIG. 3 shows a simplified schematic diagram of a scatternet formed by the multi-member Bluetooth device 100 according to one embodiment of the present disclosure.

In the flowchart of FIG. 2, operations within a column under the name of a specific device are operations to be performed by the specific device. For example, operations within a column under the label "source Bluetooth device" are operations to be performed by the source Bluetooth device 102; operations within a column under the label "main Bluetooth circuit" are operations to be performed by the main Bluetooth circuit 110; operations within a column under the label "auxiliary Bluetooth circuit" are operations to be performed by the auxiliary Bluetooth circuit 120. The same analogous arrangement also applies to the subsequent flowcharts.

As shown in FIG. 2, the main Bluetooth circuit 110 of the multi-member Bluetooth device 100 performs the operation 202 with the source Bluetooth device 102 so as to utilize various methods complying with Bluetooth communication protocols to form a first piconet 310 as shown in FIG. 3. In the operation 202, the source Bluetooth device 102 acts as a master in the first piconet 310, and the main Bluetooth circuit 110 of the multi-member Bluetooth device 100 acts as a slave in the first piconet 310.

In the operation 204, the source Bluetooth device 102 generates a first main clock CLK_P1M, and schedules the transmission or reception of Bluetooth packets in the first piconet 310 based on the first main clock CLK_P1M. Therefore, the first main clock CLK_P1M is not only a native system clock of the source Bluetooth device 102 but also a master clock of the first piconet 310 simultaneously.

In the operation 206, the source Bluetooth device 102 generates and transmits a first piconet timing packet comprising a timing data of the first main clock CLK_P1M to the first piconet 310. In practice, the source Bluetooth device 102 may utilize various appropriate data to be the timing data of the first main clock CLK_P1M. For example, the source Bluetooth device 102 may utilize a count value of a specific edge of the first main clock CLK_P1M (e.g., the rising edge) to be the timing data of the first main clock CLK_P1M, and writes the count value corresponding to the first main clock CLK_P1M into a FHS packet (frequency hop synchronization packet) so as to form the first piconet timing packet.

In the operation 208, the first Bluetooth communication circuit 111 receives the first piconet timing packet generated by the source Bluetooth device 102 through the first piconet 310, and transmits the first piconet timing packet to the first control circuit 117.

In the operation 210, the first control circuit 117 controls the first packet parsing circuit 113 to acquire the timing data (such as a relevant count value) of the aforementioned first main clock CLK_P1M from the first piconet timing packet.

In the operation 212, the first control circuit 117 controls the first clock adjusting circuit 115 to generate a first slave clock CLK_P1S1 according to the timing data of the first main clock CLK_P1M, so that the first slave clock CLK_P1S1 is synchronized with the first main clock CLK_P1M, and the first control circuit 117 utilizes the first slave clock CLK_P1S1 to be the slave clock in the first piconet 310. For example, the first control circuit 117 may control the first clock adjusting circuit 115 to adjust a frequency and/or a phase offset of a first reference clock CLK_R1 according to the timing data of the first main clock CLK_P1M, so as to generate the first slave clock CLK_P1S1 having a frequency substantially identical to the frequency of the first main clock CLK_P1M and a phase substantially aligned with the phase of the first main clock CLK_P1M.

In operations, the first control circuit 117 may control the first Bluetooth communication circuit 111 to schedule the transmission or reception of the Bluetooth packets in the first piconet 310 based on the first slave clock CLK_P1S1.

In the operation 214, the main Bluetooth circuit 110 and the auxiliary Bluetooth circuit 120 of the multi-member Bluetooth device 100 may utilize various methods complying with Bluetooth communication protocols to form a second piconet 320 as shown in FIG. 3. In the operation 214, the main Bluetooth circuit 110 acts as the master in the second piconet 320, and the auxiliary Bluetooth circuit 120 acts as the slave in the second piconet 320.

In other words, the main Bluetooth circuit 110 is not only a member of the aforementioned first piconet 310 but also a member of the second piconet 320 simultaneously.

In the operation 216, the first control circuit 117 controls the first clock adjusting circuit 115 to generate a second main clock CLK_P2M according to the timing data of the first main clock CLK_P1M or the timing data of the first slave clock CLK_P1S1, so that the second main clock CLK_P2M is synchronized with the first main clock CLK_P1M. For example, the first control circuit 117 may control the first clock adjusting circuit 115 to adjust the frequency and/or the phase offset of the aforementioned first reference clock CLK_R1 according to the timing data of the first main clock CLK_P1M or the timing data of the first slave clock CLK_P1S1, so as to generate the second main clock CLK_P2M having a frequency substantially identical to the frequency of the first main clock CLK_P1M and a phase substantially aligned with the phase of the first main clock CLK_P1M.

The first control circuit 117 may control the first Bluetooth communication circuit 111 to schedule the transmission or reception of the Bluetooth packets in the second piconet 320 based on the second main clock CLK_P2M. Therefore, the second main clock CLK_P2M is not only the native system clock of the main Bluetooth circuit 110 but also the master clock in the second piconet 320 simultaneously.

As can be appreciated from the foregoing descriptions, both the first slave clock CLK_P1S1 and the second main clock CLK_P2M generated by the first clock adjusting circuit 115 are synchronized with the first main clock CLK_P1M generated by the source Bluetooth device 102. That is, both the frequency of the first slave clock CLK_P1S1 and the frequency of the second main clock CLK_P2M are substantially identical to the frequency of the first main clock CLK_P1M, and both the phase of the first slave clock CLK_P1S1 and the phase of the second main clock CLK_P2M are substantially aligned with the phase of the first main clock CLK_P1M.

In practice, the first control circuit 117 may respectively assign different count values to the aforementioned first slave clock CLK_P1S1 and the second main clock CLK_P2M.

The aforementioned method for synchronizing the first slave clock CLK_P1S1 and the second main clock CLK_P2M of the main Bluetooth circuit 110 can effectively increase the Bluetooth bandwidth utilization efficiency of the main Bluetooth circuit 110.

In the operation 218, the first control circuit 117 generates a second piconet timing packet comprising a timing data of the second main clock CLK_P2M, and utilizes the first Bluetooth communication circuit 111 to transmit the second piconet timing packet to the second piconet 320. In practice, the first control circuit 117 may utilize various appropriate data to be the timing data of the second main clock CLK_P2M. For example, the first control circuit 117 may utilize a count value of a specific edge of the second main clock CLK_P2M (e.g., the rising edge) to be the timing data of the second main clock CLK_P2M, and writes the count value corresponding to the second main clock CLK_P2M into a FHS packet so as to form the second piconet timing packet.

In the operation 220, the second Bluetooth communication circuit 121 receives the second piconet timing packet generated by the main Bluetooth circuit 110 through the second piconet 320, and transmits the second piconet timing packet to the second control circuit 127.

In the operation 222, the second control circuit 127 controls the second packet parsing circuit 123 to acquire the timing data (such as a relevant count value) of the aforementioned second main clock CLK_P2M from the second piconet timing packet.

In the operation 224, the second control circuit 127 controls the second clock adjusting circuit 125 to generate a second slave clock CLK_P2S1 according to the timing data of the second main clock CLK_P2M, so that the second slave clock CLK_P2S1 is synchronized with the second main clock CLK_P2M, and the second control circuit 127 utilizes the second slave clock CLK_P2S1 to be the slave clock in the second piconet 320. For example, the second control circuit 127 may control the second clock adjusting circuit 125 to adjust a frequency and/or a phase offset of a second reference clock CLK_R2 according to the timing data of the second main clock CLK_P2M, so as to generate the second slave clock CLK_P2S1 having a frequency substantially identical to the frequency of the second main clock CLK_P2M and a phase substantially aligned with the phase of the second main clock CLK_P2M.

Additionally, in the operation 224, the second control circuit 127 may further control the second clock adjusting circuit 125 to generate a third slave clock CLK_P1S2 according to the timing data of the second main clock CLK_P2M, so that the third slave clock CLK_P1S2 is synchronized with the second main clock CLK_P2M. For example, the second control circuit 127 may control the second clock adjusting circuit 125 to adjust the frequency and/or the phase offset of the aforementioned second reference clock CLK_R2 according to the timing data of the second main clock CLK_P2M, so as to generate the third slave clock CLK_P1S2 having a frequency substantially identical to the frequency of the second main clock CLK_P2M and a phase substantially aligned with the phase of the second main clock CLK_P2M.

Since the second main clock CLK_P2M generated by the main Bluetooth circuit 110 is synchronized with the first main clock CLK_P1M generated by the source Bluetooth device 102, the third slave clock CLK_P1S2 generated by the second clock adjusting circuit 125 is indirectly synchronized with the first main clock CLK_P1M generated by the source Bluetooth device 102. In this way, the auxiliary Bluetooth circuit 120 is enabled to receive the Bluetooth packets in the first piconet 310 without being known by the source Bluetooth device 102.

As can be appreciated from the foregoing descriptions, both the second slave clock CLK_P2S1 and the third slave clock CLK_P1S2 generated by the second clock adjusting circuit 125 are synchronized with the second main clock CLK_P2M generated by the main Bluetooth circuit 110. That is, both the frequency of the second slave clock CLK_P2S1 and the frequency of the third slave clock CLK_P1S2 are substantially identical to the frequency of the second main clock CLK_P2M, and both the phase of the second slave clock CLK_P2S1 and the phase of the third slave clock CLK_P1S2 are substantially aligned with the phase of the second main clock CLK_P2M.

In practice, the second control circuit 127 may respectively assign different count values to the aforementioned second slave clock CLK_P2S1 and third slave clock CLK_P1S2.

The aforementioned method for synchronizing the second slave clock CLK_P2S1 and the third slave clock CLK_P1S2 of the auxiliary Bluetooth circuit 120 can effectively increase the Bluetooth bandwidth utilization efficiency of the auxiliary Bluetooth circuit 120.

Afterwards, the second control circuit 127 may control the second Bluetooth communication circuit 121 to schedule the transmission or reception of the Bluetooth packets in the second piconet 320 based on the second slave clock CLK_P2S1. Additionally, the second control circuit 127 may schedule the reception of the Bluetooth packets in the first piconet 310 based on the third slave clock CLK_P1S2 so as to sniff the Bluetooth packets in the first piconet 310.

Figure 4:
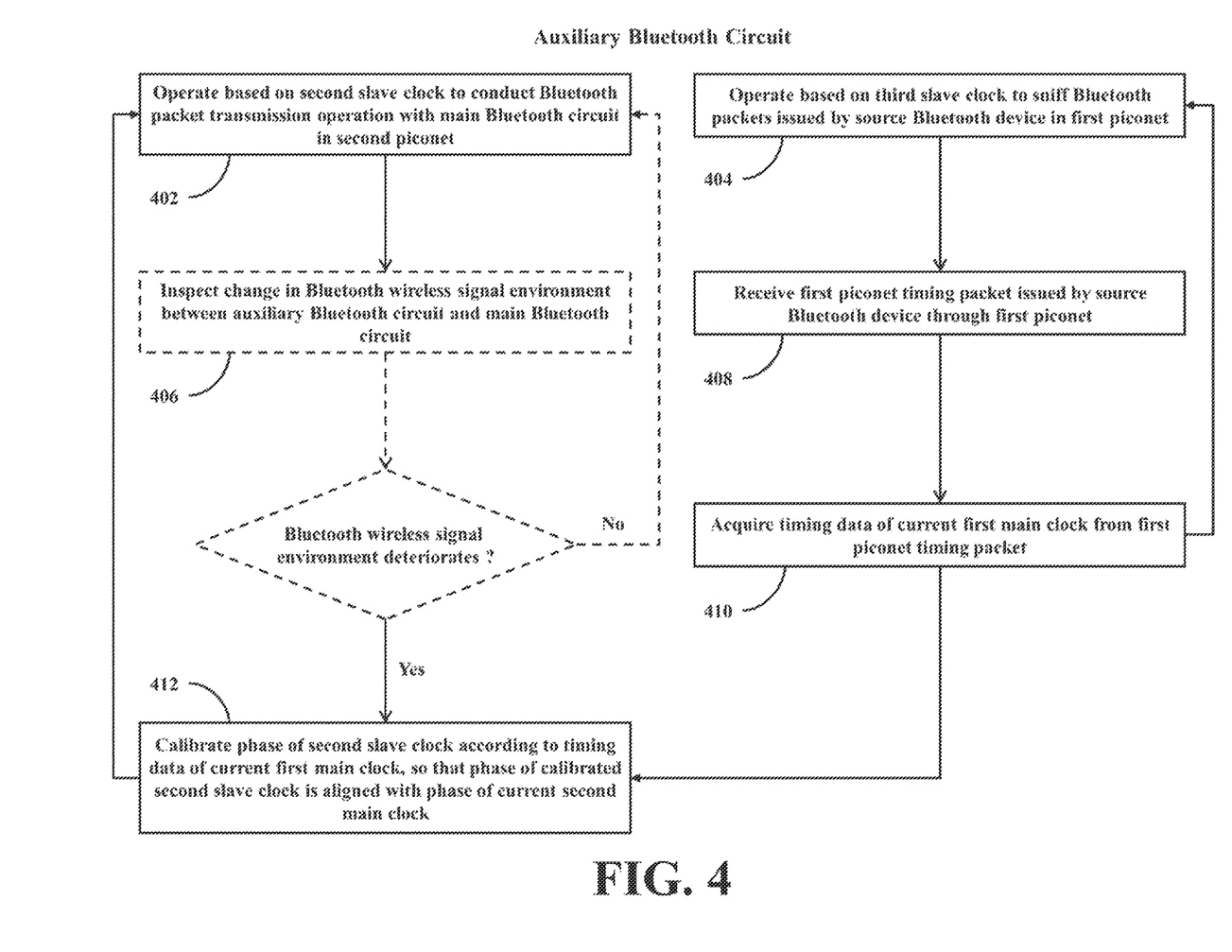
FIG. 4 shows a simplified flowchart of an internal clock updating method adopted by an auxiliary Bluetooth circuit of FIG. 1 according to one embodiment of the present disclosure.

A method for updating internal clocks adopted by the auxiliary Bluetooth circuit 120 of the multi-member Bluetooth device 100 will be further described in the following by reference to FIG. 4 through FIG. 5. FIG. 4 shows a simplified flowchart of an internal clock updating method adopted by the auxiliary Bluetooth circuit 120 according to one embodiment of the present disclosure.

As shown in FIG. 4, the second control circuit 127 may perform the operation 402 and the operation 404 in the following stage to control the second Bluetooth communication circuit 121 to participate the aforementioned packet transmission operation in the first piconet 310 and in the second piconet 320.

In the operation 402, the second control circuit 127 may control the second Bluetooth communication circuit 121 to operate based on the second slave clock CLK_P2S1 so as to conduct the Bluetooth packet transmission operation with the main Bluetooth circuit 110 in the second piconet 320.

In the operation 404, the second control circuit 127 may control the second Bluetooth communication circuit 121 to operate based on the third slave clock CLK_P1S2 so as to sniff the Bluetooth packets issued by the source Bluetooth device 102 in the first piconet 310. In other words, even though the source Bluetooth device 102 does not establish any piconet with the auxiliary Bluetooth circuit 120 in advance, the auxiliary Bluetooth circuit 120 can still operate based on the third slave clock CLK_P1S2 so as to sniff the Bluetooth packets issued by the source Bluetooth device 102.

As can be appreciated from the foregoing descriptions, during the operation of the auxiliary Bluetooth circuit 120, the wireless signal environment of Bluetooth communication may change with time due to various factors, or may change under the influence of a user's posture or the user's usage habit. If the internal clocks of the auxiliary Bluetooth circuit 120 cannot be kept synchronized with the corresponding piconet clocks, the overall operating performance of the multi-member Bluetooth device 100 would easily degrade, or it would reduce the standby time of the auxiliary Bluetooth circuit 120. In some situations, it could further increase the heat generated by and the temperature of the auxiliary Bluetooth circuit 120, thereby reducing the service life of the auxiliary Bluetooth circuit 120, or reducing the comfort level in using the auxiliary Bluetooth circuit 120 (since too much heat or high temperature might result in the user feeling uncomfortable).

Therefore, the second control circuit 127 may intermittently perform the operation 406 to inspect the change in the Bluetooth wireless signal environment between the auxiliary Bluetooth circuit 120 and the main Bluetooth circuit 110 according to the signal reception condition of the second Bluetooth communication circuit 121.

On the other hand, the second Bluetooth communication circuit 121 continues to sniff the Bluetooth packets issued by the source Bluetooth device 102, and the second Bluetooth communication circuit 121 intermittently performs the operation 408.

In the operation 408, the second Bluetooth communication circuit 121 receives the first piconet timing packet issued by the source Bluetooth device 102 through the first piconet 310, and transmits the first piconet timing packet to the second control circuit 127.

In the operation 410, the second control circuit 127 controls the second packet parsing circuit 123 to acquire the timing data (such as a relevant count value) of the current first main clock CLK_P1M from the first piconet timing packet received by the second Bluetooth communication circuit 121.

If the second control circuit 127 determines in the aforementioned operation 406 that the deterioration of the Bluetooth wireless signal environment between the auxiliary Bluetooth circuit 120 and the main Bluetooth circuit 110 exceeds a predetermined degree, the second control circuit 127 performs the operation 412.

In the operation 412, the second control circuit 127 controls the second clock adjusting circuit 125 to calibrate a phase of the second slave clock CLK_P2S1 according to the timing data of the current first main clock CLK_P1M, so that the phase of the calibrated second slave clock CLK_P2S1 is aligned with the phase of the current first main clock CLK_P1M.

As can be appreciated from the foregoing descriptions, the second main clock CLK_P2M generated by the main Bluetooth circuit 110 will theoretically be kept synchronized with the first main clock CLK_P1M generated by the source Bluetooth device 102. Therefore, the operation of that the second control circuit 127 controls the second clock adjusting circuit 125 to calibrate the phase of the second slave clock CLK_P2S1 according to the timing data of the current first main clock CLK_P1M not only renders the phase of the calibrated second slave clock CLK_P2S1 to be aligned with the phase of the current first main clock CLK_P1M but also renders the phase of the calibrated second slave clock CLK_P2S1 to be indirectly aligned with the phase of the second main clock CLK_P2M.

In other words, when the Bluetooth wireless signal environment between the auxiliary Bluetooth circuit 120 and the main Bluetooth circuit 110 deteriorates, the auxiliary Bluetooth circuit 120 is enabled to utilize the first main clock CLK_P1M generated by the source Bluetooth device 102 to calibrate the phase of the second slave clock CLK_P2S1 to render the calibrated second slave clock CLK_P2S1 to be kept synchronized with the second main clock CLK_P2M generated by the main Bluetooth circuit 110.

In this way, even if the Bluetooth wireless signal environment between the auxiliary Bluetooth circuit 120 and the main Bluetooth circuit 110 deteriorates, the aforementioned method effectively prevents the situation that the second slave clock CLK_P2S1 of the auxiliary Bluetooth circuit 120 could not be kept synchronized with the second main clock CLK_P2M.

Figure 5:
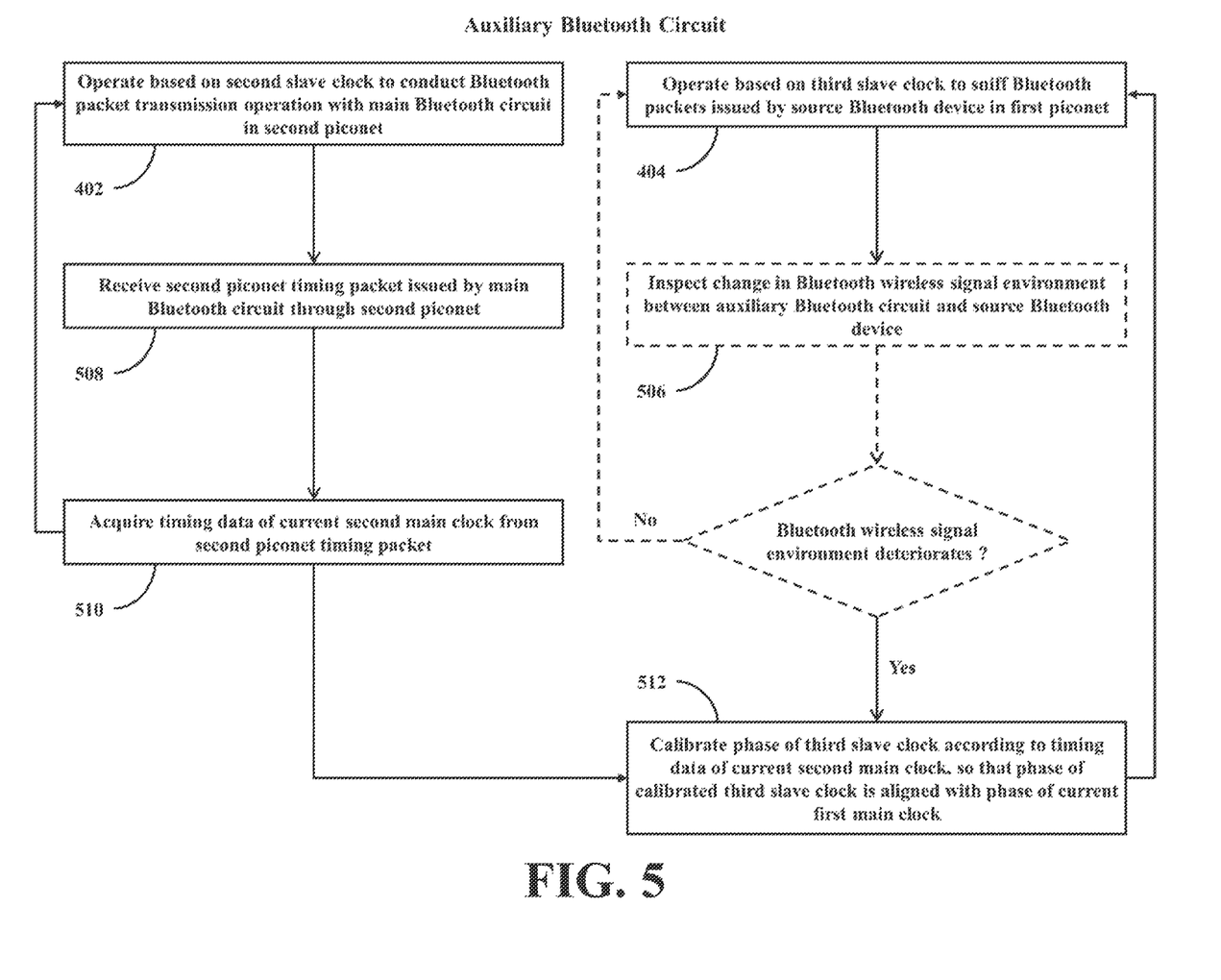
FIG. 5 shows a simplified flowchart of an internal clock updating method adopted by the auxiliary Bluetooth circuit of FIG. 1 according to another embodiment of the present disclosure.

Please refer to FIG. 5, which shows a simplified flowchart of the internal clock updating method adopted by the auxiliary Bluetooth circuit 120 according to another embodiment of the present disclosure.

As shown in FIG. 5, in the period during which the auxiliary Bluetooth circuit 120 sniffs the Bluetooth packets issued by the source Bluetooth device 102, the auxiliary Bluetooth circuit 120 may intermittently perform the operation 506.

In the operation 506, the second control circuit 127 may inspect the change in the Bluetooth wireless signal environment between the auxiliary Bluetooth circuit 120 and the source Bluetooth device 102 according to the signal reception condition of the second Bluetooth communication circuit 121.

On the other hand, the second Bluetooth communication circuit 121 continues to conduct the Bluetooth packet transmission operation with the main Bluetooth circuit 110 in the second piconet 320, and the second Bluetooth communication circuit 121 intermittently performs the operation 508.

In the operation 508, the second Bluetooth communication circuit 121 receives the second piconet timing packet issued by the main Bluetooth circuit 110 through the second piconet 320, and the second Bluetooth communication circuit 121 transmits the second piconet timing packet to the second control circuit 127.

In the operation 510, the second control circuit 127 controls the second packet parsing circuit 123 to acquire the timing data (such as a relevant count value) of the current second main clock CLK_P2M from the second piconet timing packet received by the second Bluetooth communication circuit 121.

If the second control circuit 127 determines in the aforementioned operation 506 that the deterioration of the Bluetooth wireless signal environment between the auxiliary Bluetooth circuit 120 and the source Bluetooth device 102 exceeds a predetermined degree, the second control circuit 127 performs the operation 512.

In the operation 512, the second control circuit 127 controls the second clock adjusting circuit 125 to calibrate a phase of the third slave clock CLK_P1S2 according to the timing data of the current second main clock CLK_P2M, so that the phase of the calibrated third slave clock CLK_P1S2 is aligned with the phase of the current second main clock CLK_P2M.

As can be appreciated from the foregoing descriptions, the second main clock CLK_P2M generated by the main Bluetooth circuit 110 will theoretically be kept synchronized with the first main clock CLK_P1M generated by the source Bluetooth device 102. Therefore, the operation of that the second control circuit 127 controls the second clock adjusting circuit 125 to calibrate the phase of the third slave clock CLK_P1S2 according to the timing data of the current second main clock CLK_P2M not only renders the phase of the calibrated third slave clock CLK_P1S2 to be aligned with the phase of the current second main clock CLK_P2M but also renders the phase of the calibrated third slave clock CLK_P1S2 to be indirectly aligned with the phase of the first main clock CLK_P1M.

In other words, when the Bluetooth wireless signal environment between the auxiliary Bluetooth circuit 120 and the source Bluetooth device 102 deteriorates, the auxiliary Bluetooth circuit 120 is enabled to utilize the second main clock CLK_P2M generated by the main Bluetooth circuit 110 to calibrate the phase of the third slave clock CLK_P1S2 to render the calibrated third slave clock CLK_P1S2 to be kept synchronized with the first main clock CLK_P1M generated by the source Bluetooth device 102.

In this way, even if the Bluetooth wireless signal environment between the auxiliary Bluetooth circuit 120 and the source Bluetooth device 102 deteriorates, the aforementioned method effectively prevents the situation that the third slave clock CLK_P1S2 of the auxiliary Bluetooth circuit 120 could not be kept synchronized with the first main clock CLK_P1M.

In practice, the auxiliary Bluetooth circuit 120 may perform either the internal clock updating method of aforementioned FIG. 4 or the internal clock updating method of the aforementioned FIG. 5, or the auxiliary Bluetooth circuit 120 may perform the internal clock updating method of the aforementioned FIG. 4 and the internal clock updating method of the aforementioned FIG. 5 at the same time.

As can be appreciated from the foregoing descriptions, even if the wireless signal environment of the auxiliary Bluetooth circuit 120 with respect to a specific piconet deteriorates, the auxiliary Bluetooth circuit 120 is still enabled to utilize clocks generated by other Bluetooth devices or Bluetooth circuits to calibrate the internal clocks currently adopted in other piconets. In this way, the internal clocks of the auxiliary Bluetooth circuit 120 are enabled to keep synchronized with the corresponding piconet clocks, thereby increasing the overall operating performance of the multi-member Bluetooth device 100, and increasing the standby time of the auxiliary Bluetooth circuit 120. In some situations, it can further reduce the heat generated by and the temperature of the auxiliary Bluetooth circuit 120, thereby prolonging the service life of the auxiliary Bluetooth circuit 120, or improving the comfort level in using the auxiliary Bluetooth circuit 120.

Please note that the executing order of the aforementioned operations in FIG. 4 and FIG. 5 is merely an exemplary embodiment, rather than a restriction to the practical implementations. For example, in some embodiments, the operation 406 in FIG. 4 may be omitted. In some embodiments, the operation 506 in FIG. 5 may be omitted.

In the aforementioned multi-member Bluetooth device 100, the main Bluetooth circuit 110 synchronizes both the first slave clock CLK_P1S1 and the second main clock CLK_P2M of the main Bluetooth circuit 110 with the first main clock CLK_P1M determined by the source Bluetooth device 102, thus the first clock adjusting circuit 115 can be realized with a simpler circuit structure.

Additionally, both the first slave clock CLK_P1S1 and the second main clock CLK_P2M adopted by the main Bluetooth circuit 110 are synchronized with the first main clock CLK_P1M, which effectively increases the Bluetooth bandwidth utilization efficiency of the main Bluetooth circuit 110, and also renders the method adopted by the main Bluetooth circuit 110 for updating the first slave clock CLK_P1S1 and the second main clock CLK_P2M to be less complicated.

Similarly, both the second slave clock CLK_P2S1 and the third slave clock CLK_P1S2 of the auxiliary Bluetooth circuit 120 are synchronized with the second main clock CLK_P2M determined by the main Bluetooth circuit 110, thus the second clock adjusting circuit 125 can be realized with a simpler circuit structure.

Moreover, the second slave clock CLK_P2S1 and the third slave clock CLK_P1S2 adopted by the auxiliary Bluetooth circuit 120 are both synchronized with the second main clock CLK_P2M, and are both equivalently synchronized with the first main clock CLK_P1M, which effectively increases the Bluetooth bandwidth utilization efficiency of the auxiliary Bluetooth circuit 120, and also renders the method adopted by the auxiliary Bluetooth circuit 120 for updating the second slave clock CLK_P2S1 and the third slave clock CLK_P1S2 to be less complicated.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A multi-member Bluetooth device (100) utilized to operably conduct data transmission with a source Bluetooth device (102), the source Bluetooth device (102) being acting as a master in a first piconet (310), the multi-member Bluetooth device (100) comprising:
 a main Bluetooth circuit (110), comprising:
  a first Bluetooth communication circuit (111);
  a first packet parsing circuit (113), arranged to operably parse packets received by the first Bluetooth communication circuit (111);
  a first clock adjusting circuit (115);
  a first control circuit (117), coupled with the first Bluetooth communication circuit (111), the first packet parsing circuit (113), and the first clock adjusting circuit (115), arranged to operably control the main Bluetooth circuit (110) to act as a slave in the first piconet (310), and to act as a master in a second piconet (320); and
 an auxiliary Bluetooth circuit (120), comprising:
  a second Bluetooth communication circuit (121);
  a second packet parsing circuit (123), arranged to operably parse packets received by the second Bluetooth communication circuit (121);

a second clock adjusting circuit (125); and a second control circuit (127), coupled with the second Bluetooth communication circuit (121), the second packet parsing circuit (123), and the second clock adjusting circuit (125), arranged to operably control the auxiliary Bluetooth circuit (120) to act as a slave in the second piconet (320);

wherein the first control circuit (117) is further arranged to operably conduct following operations:

controlling the first clock adjusting circuit (115) to generate a first slave clock (CLK_P1S1) and a second main clock (CLK_P2M) according to a timing data of a first main clock (CLK_P1M) generated by the source Bluetooth device (102), so that both the first slave clock (CLK_P1S1) and the second main clock (CLK_P2M) are synchronized with the first main clock (CLK_P1M);

controlling the first Bluetooth communication circuit (111) to transmit or receive packets in the first piconet (310) according to the first slave clock (CLK_P1S1); and controlling the first Bluetooth communication circuit (111) to transmit or receive packets in the second piconet (320) according to the second main clock (CLK_P2M);

wherein the second control circuit (127) is further arranged to operably conduct following operations:

controlling the second clock adjusting circuit (125) to generate a second slave clock (CLK_P2S1) and a third slave clock (CLK_P1S2) according to a timing data of the second main clock (CLK_P2M), so that both the second slave clock (CLK_P2S1) and the third slave clock (CLK_P1S2) are synchronized with the second main clock (CLK_P2M); and controlling the second Bluetooth communication circuit (121) to operate based on the third slave clock (CLK_P1S2) to sniff Bluetooth packets issued in the first piconet (310) by the source Bluetooth device (102).

2. The multi-member Bluetooth device (100) of claim 1, wherein the first control circuit (117) is arranged to operably control the first clock adjusting circuit (115) to generate the first slave clock (CLK_P1S1) having a frequency substantially identical to a frequency of the first main clock (CLK_P1M) and a phase substantially aligned with a phase of the first main clock (CLK_P1M) according to the timing data of the first main clock (CLK_P1M), and the first control circuit (117) further controls the first clock adjusting circuit (115) to generate the second main clock (CLK_P2M) having a frequency substantially identical to the frequency of the first main clock (CLK_P1M) and a phase substantially aligned with the phase of the first main clock (CLK_P1M) according to the timing data of the first main clock (CLK_P1M) or a timing data of the first slave clock (CLK_P1S1).

3. The multi-member Bluetooth device (100) of claim 2, wherein the first Bluetooth communication circuit (111) is further arranged to operably receive a first piconet timing packet generated by the source Bluetooth device (102), and the first packet parsing circuit (113) is further arranged to operably acquire the timing data of the first main clock (CLK_P1M) from the first piconet timing packet.

4. The multi-member Bluetooth device (100) of claim 3, wherein the first control circuit (117) further generates a second piconet timing packet comprising the timing data of the second main clock (CLK_P2M), and transmits the second piconet timing packet to the auxiliary Bluetooth circuit (120) through the first Bluetooth communication circuit (111);

wherein the second Bluetooth communication circuit (121) receives the second piconet timing packet generated by the main Bluetooth circuit (110), and the second packet parsing circuit (123) acquires the timing data of the second main clock (CLK_P2M) from the second piconet timing packet.

5. The multi-member Bluetooth device (100) of claim 2, wherein the second control circuit (127) is arranged to operably control the second clock adjusting circuit (125) to generate the second slave clock (CLK_P2S1) having a frequency substantially identical to a frequency of the second main clock (CLK_P2M) and a phase substantially aligned with a phase of the second main clock (CLK_P2M) according to the timing data of the second main clock (CLK_P2M), and to generate the third slave clock (CLK_P1S2) having a frequency substantially identical to the frequency of the first main clock (CLK_P1M) and a phase substantially aligned with the phase of the first main clock (CLK_P1M) according to the timing data of the second main clock (CLK_P2M).

6. The multi-member Bluetooth device (100) of claim 2, wherein the second control circuit (127) is further arranged to operably control the second Bluetooth communication circuit (121) to operate based on the second slave clock (CLK_P2S1), so that the second Bluetooth communication circuit (121) conducts a Bluetooth packet transmission with the main Bluetooth circuit (110) in the second piconet (320).

7. The multi-member Bluetooth device (100) of claim 6, wherein the second control circuit (127) is further arranged to operably control the second clock adjusting circuit (125) to calibrate a phase of the second slave clock (CLK_P2S1) according to a timing data of the first main clock (CLK_P1M) currently generated by the source Bluetooth device (102), so that a phase of a calibrated second slave clock (CLK_P2S1) is substantially aligned with a phase of the second main clock (CLK_P2M) currently generated by the main Bluetooth circuit (110).

8. The multi-member Bluetooth device (100) of claim 6, wherein the second control circuit (127) is further arranged to operably conduct following operations:

inspecting a change in a Bluetooth wireless signal environment between the auxiliary Bluetooth circuit (120) and the main Bluetooth circuit (110); and if the Bluetooth wireless signal environment between the auxiliary Bluetooth circuit (120) and the main Bluetooth circuit (110) deteriorates, controlling the second clock adjusting circuit (125) to calibrate a phase of the second slave clock (CLK_P2S1) according to a timing data of the first main clock (CLK_P1M) currently generated by the source Bluetooth device (102), so that a phase of a calibrated second slave clock (CLK_P2S1) is substantially aligned with a phase of the second main clock (CLK_P2M) currently generated by the main Bluetooth circuit (110).

9. The multi-member Bluetooth device (100) of claim 6, wherein the second control circuit (127) is further arranged to operably control the second clock adjusting circuit (125) to calibrate a phase of the second slave clock (CLK_P2S1) according to a timing data of the second main clock (CLK_P2M) currently generated by the main Bluetooth circuit (110), so that a phase of a calibrated second slave clock (CLK_P2S1) is substantially aligned with a phase of the first main clock (CLK_P1M) currently generated by the source Bluetooth device (102).

10. The multi-member Bluetooth device (100) of claim 6, wherein the second control circuit (127) is further arranged to operably conduct following operations:

inspecting a change in a Bluetooth wireless signal environment between the auxiliary Bluetooth circuit (120) and the source Bluetooth device (102); and     if the Bluetooth wireless signal environment between the auxiliary Bluetooth circuit (120) and the source Bluetooth device (102) deteriorates, controlling the second clock adjusting circuit (125) to calibrate a phase of the second slave clock (CLK_P2S1) according to a timing data of the second main clock (CLK_P2M) currently generated by the main Bluetooth circuit (110), so that a phase of a calibrated second slave clock (CLK_P2S1) is substantially aligned with a phase of the first main clock (CLK_P1M) currently generated by the source Bluetooth device (102).

* * * * *